United States Patent
Oh et al.

(10) Patent No.: US 9,656,652 B2
(45) Date of Patent: May 23, 2017

(54) METHOD FOR CONTROLLING REGENERATIVE BRAKING OF VEHICLE

(71) Applicants: Hyundai Motor Company, Seoul (KR); Kia Motors Corporation, Seoul (KR)

(72) Inventors: Kyoung Cheol Oh, Suwon-si (KR); Deok Keun Shin, Yongin-si (KR); Jee Wook Huh, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 14/144,092

(22) Filed: Dec. 30, 2013

(65) Prior Publication Data

US 2015/0094889 A1 Apr. 2, 2015

(30) Foreign Application Priority Data

Sep. 30, 2013 (KR) ........................ 10-2013-0115817

(51) Int. Cl.
| | | |
|---|---|---|
| *B60T 13/74* | (2006.01) | |
| *B60W 10/08* | (2006.01) | |
| *B60T 1/10* | (2006.01) | |
| *B60W 10/11* | (2012.01) | |
| *B60W 10/184* | (2012.01) | |
| *B60W 30/18* | (2012.01) | |
| *B60W 30/19* | (2012.01) | |

(Continued)

(52) U.S. Cl.
CPC ............... *B60T 13/74* (2013.01); *B60T 1/10* (2013.01); *B60W 10/08* (2013.01); *B60W 10/11* (2013.01); *B60W 10/184* (2013.01); *B60W 20/14* (2016.01); *B60W 20/30* (2013.01); *B60W 30/18127* (2013.01); *B60W 30/19* (2013.01); *B60T 2270/60* (2013.01); *B60Y 2300/89* (2013.01); *Y10T 477/35* (2015.01)

(58) Field of Classification Search
CPC ..... B60T 1/10; B60T 13/662; B60T 2201/022
USPC .......................................... 701/22, 70, 30.8
See application file for complete search history.

(56) References Cited

U.S. PATENT DOCUMENTS

| | | | | |
|---|---|---|---|---|
| 6,081,760 A | * | 6/2000 | Dreibholz | ............... F16H 61/12 701/30.8 |
| 6,194,802 B1 | * | 2/2001 | Rao | ...................... H02K 21/024 310/191 |

(Continued)

FOREIGN PATENT DOCUMENTS

| | | |
|---|---|---|
| JP | 2006-304599 A | 11/2006 |
| JP | 2010-074886 A | 4/2010 |

(Continued)

*Primary Examiner* — Redhwan K Mawari
(74) *Attorney, Agent, or Firm* — McDermott Will & Emery LLP

(57) ABSTRACT

A method for controlling regenerative braking of a vehicle is provided, in which a driving area of a motor is decided when shifting gears during regenerative braking, and an amount of regenerative braking is determined based on the decided result. The method includes a first process of deciding whether motor torque is in a constant power mode, a second process of deciding whether the motor torque is in a constant torque mode, and a third process of deciding whether the mode of the motor torque is converted into the constant torque mode from the constant power mode.

11 Claims, 9 Drawing Sheets

(51) Int. Cl.
   *B60W 20/30*   (2016.01)
   *B60W 20/14*   (2016.01)

(56) References Cited

U.S. PATENT DOCUMENTS

| | | | | |
|---|---|---|---|---|
| 8,855,844 | B2* | 10/2014 | Schwindt | B60K 31/0008 |
| | | | | 701/22 |
| 9,174,631 | B2* | 11/2015 | Heap | B60W 10/11 |
| 2001/0004203 | A1* | 6/2001 | Matsubara | B60L 11/12 |
| | | | | 322/16 |
| 2002/0094908 | A1* | 7/2002 | Urasawa | B60K 6/383 |
| | | | | 477/3 |
| 2004/0054450 | A1* | 3/2004 | Nakamura | B60L 7/16 |
| | | | | 701/22 |
| 2004/0162186 | A1* | 8/2004 | Takatori | F16H 61/061 |
| | | | | 477/121 |
| 2004/0242370 | A1* | 12/2004 | Iwatsuki | F16H 61/66272 |
| | | | | 477/45 |
| 2008/0185199 | A1* | 8/2008 | Kimura | B60K 6/445 |
| | | | | 180/242 |
| 2009/0187320 | A1* | 7/2009 | Antanaitis | B60T 8/172 |
| | | | | 701/70 |
| 2011/0118920 | A1* | 5/2011 | Kim | B60K 6/48 |
| | | | | 701/22 |
| 2011/0238274 | A1* | 9/2011 | Tsuda | F16H 61/061 |
| | | | | 701/58 |
| 2015/0094889 | A1* | 4/2015 | Oh | B60T 13/74 |
| | | | | 701/22 |

FOREIGN PATENT DOCUMENTS

| | | |
|---|---|---|
| JP | 2010-288343 A | 12/2010 |
| JP | 2011-015515 A | 1/2011 |
| KR | 10-2006-0030211 A | 4/2006 |
| KR | 10-2009-0123182 A | 12/2009 |
| KR | 10-2011-0044565 A | 4/2011 |
| KR | 10-2012-0055422 A | 5/2012 |

* cited by examiner

METHOD FOR CONTROLLING REGENERATIVE BRAKING OF VEHICLE

CROSS-REFERENCE TO RELATED APPLICATION

This application claims under 35 U.S.C. §119(a) the benefit of priority to Korean Patent Application No. 10-2013-0115817 filed in the Korean Intellectual Property Office on Sep. 30, 2013, the entire contents of which are incorporated herein by reference.

TECHNICAL FIELD

The present disclosure relates to a method for controlling regenerative braking of a vehicle. More particularly, the present disclosure relates to a method for controlling regenerative braking, in which an amount of regenerative braking is determined based on characteristics of a driving motor when shifting gears during regenerative braking of a vehicle having a discrete variable transmission mounted therein.

BACKGROUND

A regenerative braking technology maximizes the fuel efficiency of a green vehicle, such as a hybrid vehicle, an electric vehicle, a fuel cell vehicle, and the like. The regenerative braking technology is a technology to generate electrical energy by applying a reverse torque to an electric motor and using the energy generated during braking. Thus, the electrical energy generated is stored in a high-voltage battery to be used later to power the motor. The regenerative braking technology is mostly applied to the green vehicles.

When vehicle braking is applied, a total braking amount is determined by a driver's braking request. In this case, regenerative braking takes charge of a portion of the total braking amount, and hydraulic braking other than regenerative braking is performed. Thus, if regenerative braking torque transmitted to wheels is accurately estimated, stable braking can be executed without any change in deceleration.

However, in a vehicle having a discrete variable transmission mounted therein, deceleration may vary due to the difficulty in precisely controlling regenerative braking when shifting gears during regenerative braking.

As shown in FIG. 1, in the conventional method, if a driver's braking intention is input (S10), a total braking amount is determined based on the driver's braking intention (S11). A regenerative braking allowance amount in the total braking amount is determined (S12), and it is then decided whether regenerative braking is possible (S13). In a case where regenerative braking is possible, the amount of regenerative braking is determined (S14), the amount of regenerative braking is compensated (S15), and a hydraulic braking amount is then determined (S16). In a case where regenerative braking is impossible, the hydraulic braking amount is immediately determined.

In this case, it is decided whether gear shifting is made through a transmission CAN signal. In a case where the gear shifting is made, the regenerative braking amount is calculated via an actual gear ratio. The regenerative braking amount is compensated to have a value approximate to the actual gear ratio based on a target gear step and a shifting phase.

However, in the conventional method, as shown in FIG. 2, there may occur a failure in compensating for the regenerative braking mount based on a braking degree and gear shifting. A sudden change in the hydraulic braking amount may be caused due to a sudden change in the regenerative braking amount. In addition, the linearity of braking may be deteriorated due to a sudden change in deceleration sensation.

SUMMARY

The present disclosure provides a method for controlling regenerative braking of a vehicle, in which an amount of regenerative braking is appropriately determined by considering characteristics of a motor when shifting gears during regenerative braking of the vehicle, thus providing stable braking without any change in deceleration.

An exemplary embodiment of the present disclosure provides a method for controlling regenerative braking of a vehicle, in which a driving area of a motor is decided when shifting gears in the vehicle during regenerative braking, and an amount of regenerative braking is determined.

The method includes deciding whether motor torque is in a constant power mode in order to decide the driving area of the motor.

It is decided whether motor torque is in a constant torque mode in order to decide the driving area of the motor.

It is decided whether a motor torque mode is converted into the constant torque mode from the constant power mode in order to decide the driving area of the motor.

When the motor torque is in the constant power mode, the regenerative braking amount is determined using motor torque before torque intervention of a transmission control unit (TCU) and a gear ratio during gear shifting in the constant power mode.

When the motor torque is the constant torque mode, the regenerative braking amount is determined using motor torque before torque intervention of a transmission control unit (TCU) and a gear ratio during gear shifting in the constant torque mode.

When the mode of the motor torque is converted into the constant torque mode from the constant power mode, the regenerative braking amount is determined using a virtual motor torque which is fixed to the constant torque mode and the gear ratio during gear shifting in the mode conversion.

Another exemplary embodiment of the present disclosure provides a method for controlling a regenerative braking execution when shifting gears in a vehicle during regenerative braking. The method includes a first process of deciding whether motor torque is in a constant power mode. A second process decides whether the motor torque is in a constant torque mode. A third process decides whether a mode of the motor torque is converted into the constant torque mode from the constant power mode, wherein a regenerative braking amount is determined based on a result of the first to third processes.

When the motor torque is in the constant power mode, the regenerative braking amount may be determined by $REGEN_{AV\_StadyPower} = T_{m\_BeforeInt} * GR_{cal} * Eff_{TM}$, and a gear ratio during gear shifting may use a value calculated by $$GR_{cal} = \frac{\omega_{TmIn}}{\omega_{TmOut}},.$$

Where, $GR_{cal}$ is the calculated gear ratio during gear shifting, $\omega_{TmIn}$ is a transmission input speed, $\omega_{TmOut}$ is a transmission output speed, $REGEN_{AV\_StadyPower}$ is the amount of regenerative braking in the constant power mode, $T_{m\_BeforeInt}$ is motor torque before torque intervention, and $Eff_{TM}$ is a transmission efficiency.

When the motor torque is in the constant torque mode, the regenerative braking amount may be determined by $REGEN_{AV\_StadyTorque}=T_{m\_BeforeInt}*GR_{cal}*Eff_{TM}$, and a gear ratio during the gear shifting may use a value calculated by $$GR_{cal} = GR_{before} + \int_{T=0}^{T_{shift\_end}} \alpha \, dT.$$

Where, $GR_{cal}$ is the gear ratio during gear shifting in the constant torque mode, $GR_{before}$ is a gear ratio before shifting gears, a is a gear ratio slope in the constant torque mode, $REGEN_{AV\_StadyTorque}$ is the amount of regenerative braking in the constant torque mode, $T_{m\_BeforeInt}$ is motor torque before torque intervention, and $T_{shift\_end}$ is a shift end time.

The gear ratio slope in the constant torque mode may be determined by $$\alpha = \frac{GR_{diff}}{\Delta T_{shift}},$$

and a differential gear ratio may use a value calculated by $GR_{diff}=GR_{after}-GR_{before}$. Where, $GR_{after}$ is a gear ratio after shifting gears, and $\Delta T_{shift}$ is a shift time.

When the mode of the motor torque is converted into the constant torque mode from the constant power mode, the amount of regenerative braking may be determined by $REGEN_{AV\_ModeChange}=T_{m\_Virtual}*GR_{cal}*Eff_{TM}$, and a gear ratio during gear shifting may use a value calculated by $$GR_{cal} = GR_{before} + \int_{T=0}^{T_{shift\_end}} \gamma \, dT.$$

Where, $REGEN_{AV\_ModeChange}$ is the amount of regenerative braking in the mode conversion, $T_{m\_Virtual}$ is a virtual motor torque which is fixed to the constant torque mode, $GR_{cal}$ is the gear ratio during gear shifting in the mode conversion, $Eff_{TM}$ is a transmission efficiency, $GR_{before}$ is a gear ratio before shifting gears, γ is a gear ratio slope in the mode conversion, and $T_{shift\_end}$ is a shift end time.

A gear ratio slope (α) when the motor torque is in the constant torque mode may be used as the gear ratio slope (γ) in the mode conversion, and the gear ratio slope (α) may be calculated by $$\alpha = \frac{GR_{diff}}{\Delta T_{shift}}.$$

Where, $GR_{diff}$ is a differential gear ratio between before and after gear shifting, and $\Delta T_{shift}$ is a shift time.

Other aspects and exemplary embodiments of the disclosure are discussed infra.

In the method for controlling regenerative braking according to the present disclosure, regenerative braking torque transmitted to wheels is appropriately controlled by determining a regenerative braking amount, based on characteristics of the motor when shifting gears during regenerative braking of the vehicle, thus performing stable braking without any change in deceleration.

The above and other features of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
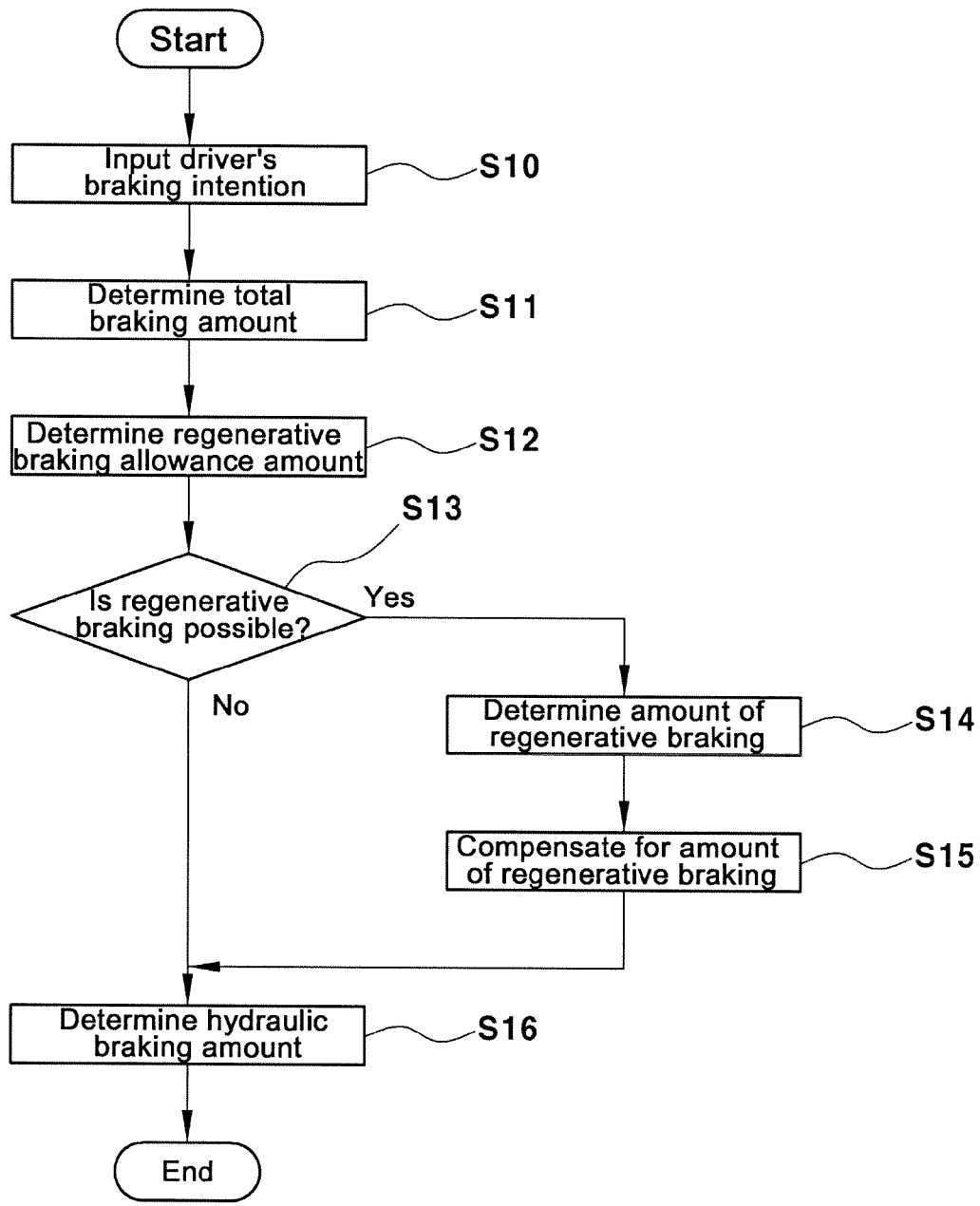
FIG. 1 is a flowchart illustrating a method for controlling regenerative braking when shifting gears in a vehicle having a discrete variable transmission mounted therein according to the related art.
Figure 2:
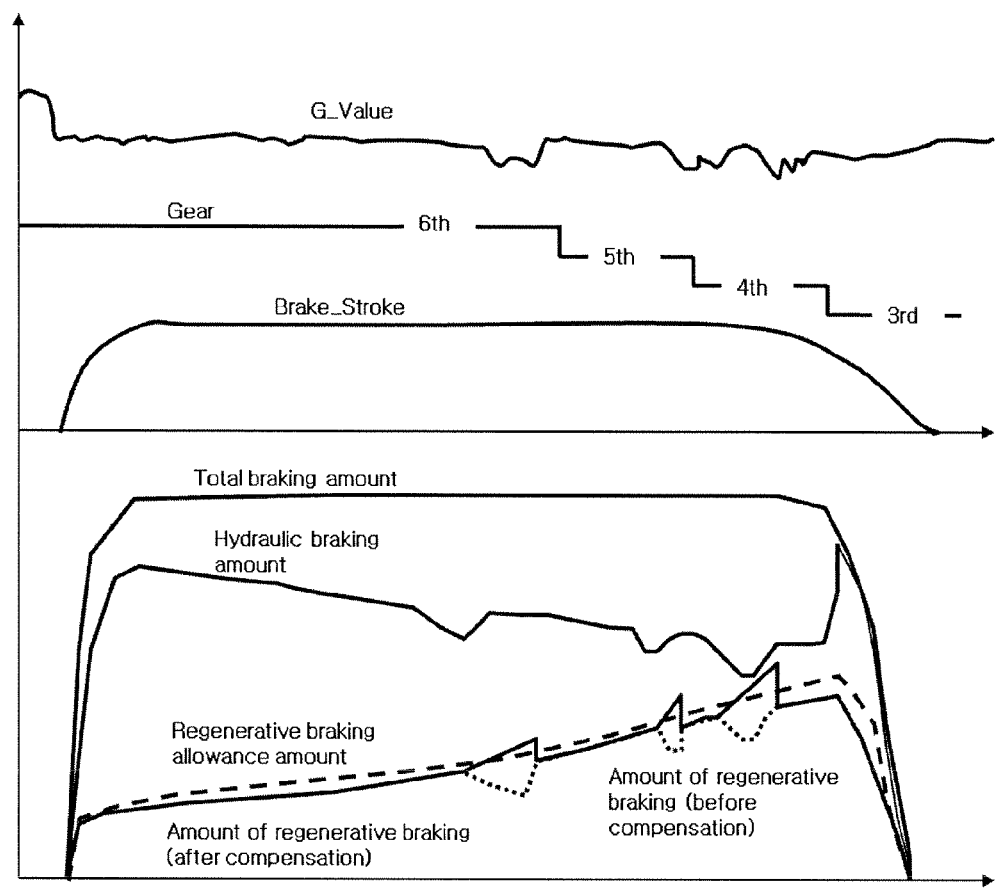
FIG. 2 is a graph illustrating a problem caused by the related art method.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a method for determining and controlling a regenerative braking amount by considering characteristics of a motor, when shifting gears during regenerative braking of a vehicle having a discrete variable transmission mounted therein. First, torque characteristics of the motor used in regenerative braking will be described.

As known in the art, the motor is generally divided into a constant torque area and a constant power area according to the driving speed of the motor. In this case, the speed of the motor, which determines two driving areas, is referred to as a base speed (base revolution per minute (RPM)).

Figure 3:
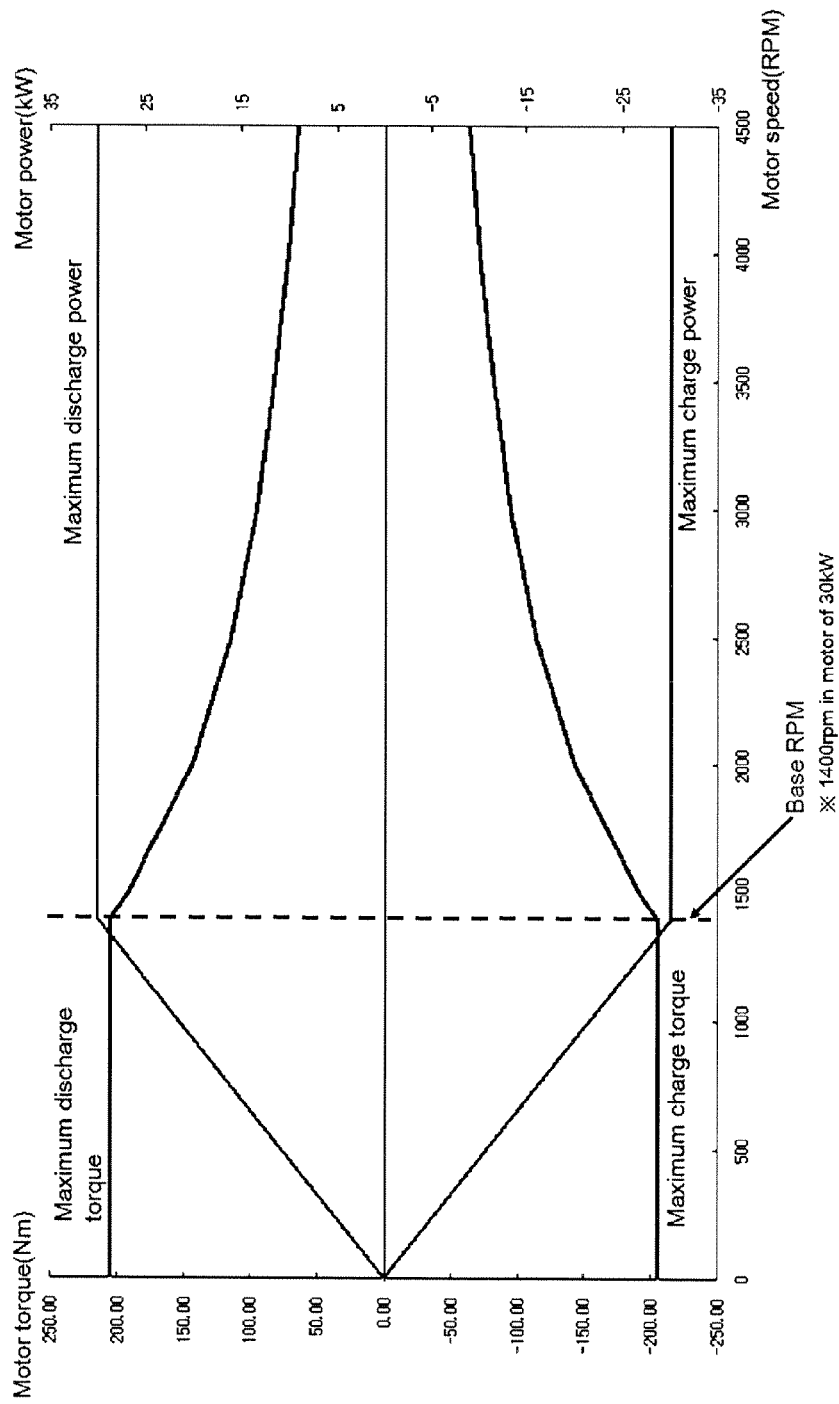
FIG. 3 is a graph illustrating characteristics of a general driving motor for a vehicle.

As shown in FIG. 3, the motor has constant torque characteristics in a driving area of the base speed or less. That is, motor torque is constant in the constant torque area, and the absolute value of motor power (motor torque×motor speed) constantly increases in proportion to motor speed. In addition, the motor has constant power characteristics in a driving area of the base speed or more. That is, the motor power is constant in the constant power area, and the absolute value of the motor torque (motor power/motor speed) decreases in inverse proportion to the motor speed.

A regenerative braking amount estimates motor torque transmitted to a wheel in regenerative braking. The regenerative braking amount may be calculated as shown in Equation 1.

$$REGEN_{AV} = T_m * GR * Eff_{TM} \quad \text{[Equation 1]}$$

Where, $REGEN_{AV}$ is a regenerative braking amount, $T_m$ is the motor torque, $GR$ is a gear ratio, and $Eff_{TM}$ is a transmission efficiency.

However, Equation 1 cannot be used during gear shifting due to the following reasons:

First, since the motor torque is decreased by torque intervention of a transmission control unit (TCU) (transmission input torque for smooth gear shifting is requested by the TCU), the motor has other type of motor torque according to a gear shifting situation. Through such a shifting mechanism, it is difficult to estimate the actual torque transmitted to the wheel using the amount of regenerative braking.

Second, the gear ratio is also changed during gear shifting. Therefore, in a case where the amount of regenerative braking is calculated as shown in Equation 1, it is impossible to estimate the actual regenerative braking torque transmitted to the wheel using the amount of regenerative braking. In addition, hydraulic braking with a relatively slow reaction does not estimate a target value due to a sudden change in the regenerative braking amount, thereby causing a variation in deceleration sensation.

Accordingly, when shifting gears in regenerative braking, the amount of regenerative braking is constantly increased during gear shifting with consideration of the regenerative braking amount before/after gear shifting, so that hydraulic braking can estimate the target value. In this case, the TCU transmits regenerative braking torque as much as the amount of regenerative braking to the wheel through the torque intervention.

A method for constantly increasing the amount of regenerative braking when shifting gears during regenerative braking is as follows:

First, in order to calculate the amount of regenerative braking during gear shifting, motor torque before the torque intervention of the TCU is used rather than the actual motor torque after the torque intervention of the TCU. Since the motor torque before the torque intervention is changed depending on the motor speed, it is possible to estimate a change in motor torque during gear shifting. Thus, the motor torque before the torque intervention of the TCU is used to calculate the amount of regenerative braking. In this case, the torque intervention of the TCU is a transmission input torque (i.e., motor torque) which is requested by the TCU in order to smoothly shift the gears.

The motor torque (motor torque used in the calculation of the amount of regenerative braking) is divided into a constant power mode, a constant torque mode, and a mode conversion according to the characteristics of the motor. That is, when shifting gears during regenerative braking, the amount of regenerative braking is calculated using the constant power mode, the constant torque mode, and the mode conversion according to the characteristics of the motor. The amount of regenerative braking is appropriately controlled using the value calculated as described above.

A method for controlling (calculating) the amount of regenerative braking in the constant power mode will be described hereinafter.

A gear ratio in the constant power mode uses a gear ratio ($GR_{cal}$) during gear shifting, which is calculated using a transmission input speed ($\omega_{TmIn}$) and a transmission output speed ($\omega_{TmOut}$), closest to the actual gear ratio as shown in the following Equation 2.

The motor torque in the constant power area is changed depending on the motor speed. Hence, when the amount of regenerative braking ($REGEN_{AV\_StadyPower}$) is calculated by multiplying the actual gear ratio ($GR_{cal}*Eff_{TM}$) and the motor torque before the torque intervention ($T_{m\_BeforeInt}$) as shown in the following Equation 3, the amount of regenerative braking ($REGEN_{AV\_StadyPower}$) is constantly increased, so that it is possible to ensure deceleration sensation during gear shifting.

$$GR_{cal} = \frac{\omega_{TmIn}}{\omega_{TmOut}} \quad \text{[Equation 2]}$$

$$REGEN_{AV\_StadyPower} = T_{m\_BeforeInt} * GR_{cal} * Eff_{TM} \quad \text{[Equation 3]}$$

Here, $GR_{cal}$ is the calculated gear ratio during gear shifting, $\omega_{TmIn}$ is the transmission input speed, $\omega_{TmOut}$ is the transmission output speed, $REGEN_{AV\_StadyPower}$ is the amount of regenerative braking in the constant power mode, $T_{m\_BeforeInt}$ is the motor torque before the torque intervention, and $Eff_{TM}$ is a transmission efficiency.

In addition, the amount of regenerative braking ($REGEN_{AV\_StadyPower}$) in the constant power mode may be calculated as shown in the following Equation 3-1 without considering the transmission efficiency. In a case where the amount of regenerative braking in the constant power mode ($REGEN_{AV\_StadyPower}$) is calculated as shown in Equation 3 by considering the transmission efficiency, a more accurate value is calculated.

$$REGEN_{AV\_StadyPower} = T_{m\_BeforeInt} * GR_{cal} \quad \text{[Equation 3-1]}$$

Figure 4:
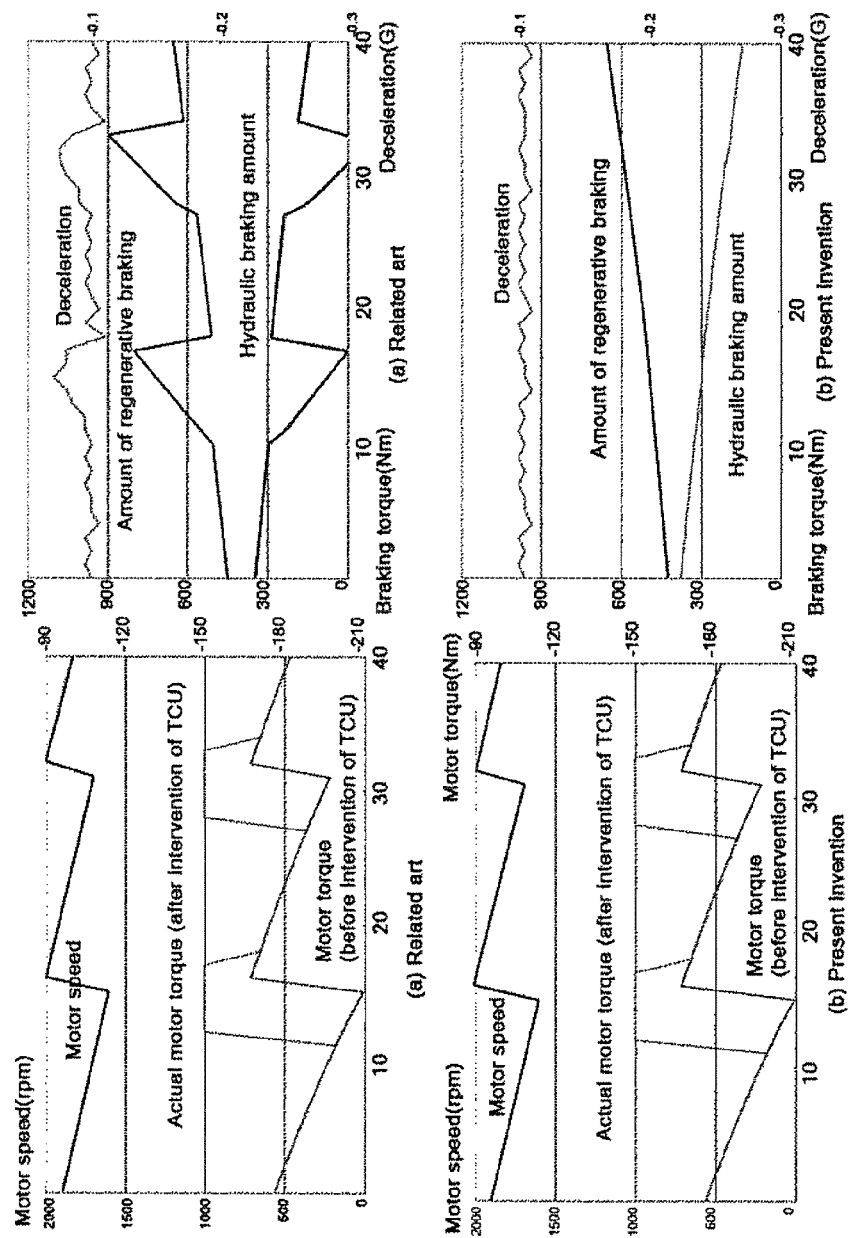
FIG. 4 is a graph illustrating a result obtained by controlling an amount of regenerative braking in a constant power mode condition of motor torque, as compared with the conventional method, according to the present disclosure.

Referring to FIG. 4, the amount of regenerative braking during gear shifting is controlled in a constant power mode condition of the motor torque. As a result, in a case where the amount of regenerative braking is controlled based on Equation 3, the amount of regenerative braking is constantly increased, so that it is possible to ensure the deceleration sensation during gear shifting, as compared with the related art.

Next, a method for controlling (calculating) the amount of regenerative braking in the constant torque mode will be described. The gear ratio in the constant torque mode uses a gear ratio during gear shifting ($GR_{cal}$) increased using a gear ratio slope (α) of the following Equation 5 in consideration of a differential ratio (or a differential gear ratio) before/after transmission ($GR_{diff}$ of Equation 4). In this case, the gear ratio during gear shifting ($GF_{cal}$) may be calculated as shown in the following Equation 6.

The motor torque before the torque intervention ($T_{m\_BeforeInt}$) is not changed regardless of the motor speed, and the gear ratio during gear shifting ($GR_{cal}$) is calculated as shown in the following Equation 6. Thus, in a case where the amount of regenerative braking ($REGEN_{AV\_StadyTorque}$) is calculated by multiplying the motor torque before the torque intervention ($T_{m\_BeforeInt}$) and the calculated gear ratio during gear shifting ($GR_{cal}$), the amount of regenerative braking ($REGEN_{AV\_StadyTorque}$) is constantly increased, so that it is possible to ensure the deceleration sensation during gear shifting.

$$GR_{diff} = GR_{after} - GR_{before} \quad \text{[Equation 4]}$$

$$\alpha = \frac{GR_{diff}}{\Delta T_{shift}} \quad \text{[Equation 5]}$$

$$GR_{cal} = GR_{before} + \int_{T=0}^{T_{shift\_end}} \alpha \, dT \quad \text{[Equation 6]}$$

$$REGEN_{AV\_StadyTorque} = T_{m\_BeforeInt} * GR_{cal} * Eff_{TM} \quad \text{[Equation 7]}$$

Where, $GR_{diff}$ is the differential ratio, $GR_{after}$ is the gear ratio after gear shifting, $GR_{before}$ is the gear ratio before gear shifting, a is the gear ratio slope in the constant torque mode, $\Delta T_{shift}$ is the shift time, $GR_{cal}$ is the calculated gear ratio during gear shifting, $REGEN_{AV\_StadyTorque}$ is the amount of regenerative braking in the constant torque mode, $T_{m\_BeforeInt}$ is the motor torque before the torque intervention, $Eff_{TM}$ is the transmission efficiency, and $T_{shift\_end}$ is the shift end time.

The amount of regenerative braking in the constant torque mode ($REGEN_{AV\_StadyTorque}$) may be calculated as shown in the following Equation 7-1 in consideration of the transmission efficiency. In a case where the amount of regenerative braking in the constant torque mode ($REGEN_{AV\_StadyTorque}$) is calculated as shown in Equation 7 by considering the transmission efficiency, a more exact value is calculated.

$$REGEN_{AV\_StadyTorque} = T_{m\_BeforeInt} * GR_{cal} \quad \text{[Equation 7-1]}$$

Figure 5:
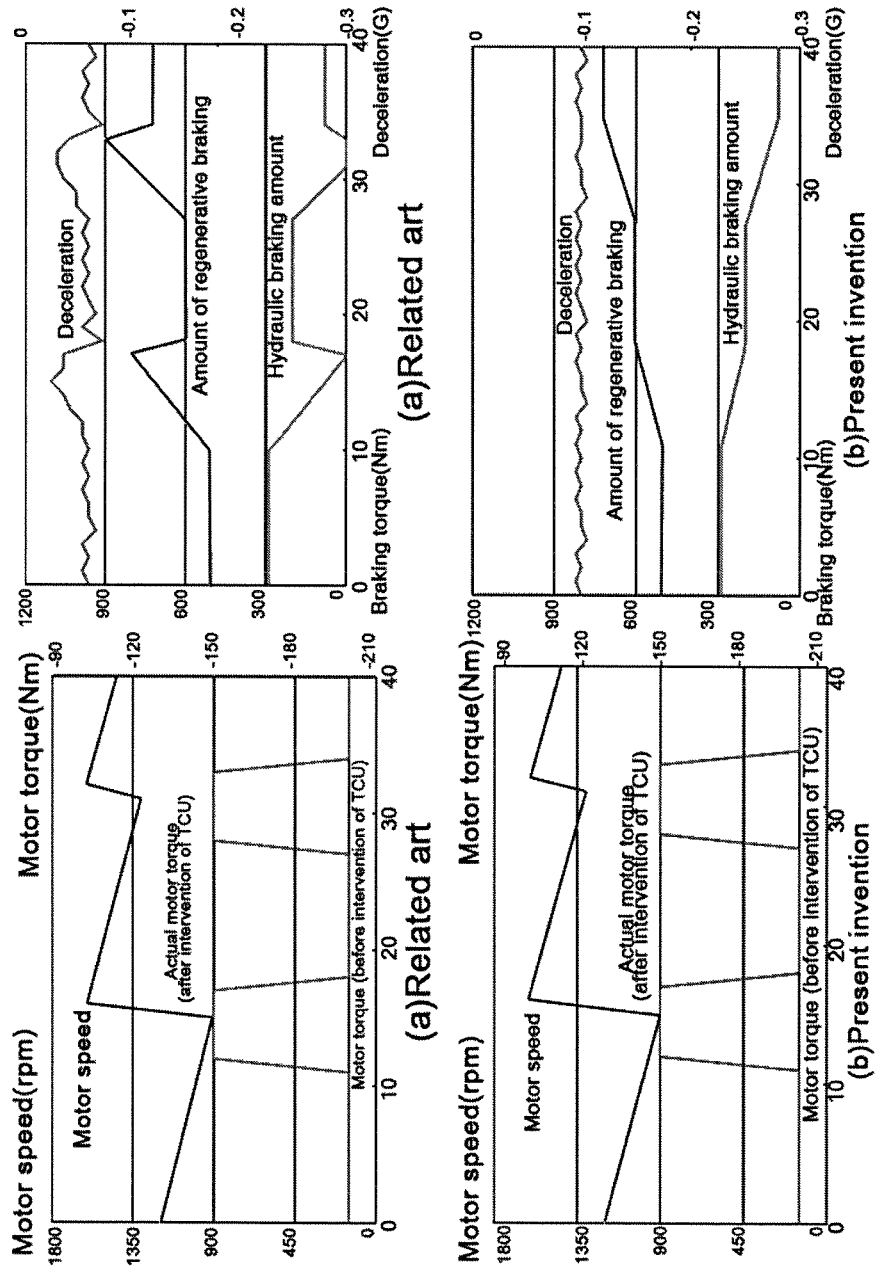
FIG. 5 is a graph illustrating a result obtained by controlling an amount of regenerative braking in a constant torque mode condition of motor torque, as compared with the conventional method, according to the present disclosure.

Referring to FIG. 5, the amount of regenerative braking during the gear shifting is controlled in a constant torque mode condition of the motor torque. As a result, in a case where the amount of regenerative braking is controlled based on the value calculated through Equation 7, the amount of regenerative braking is constantly increased. Therefore, it is possible to ensure the deceleration sensation during gear shifting, as compared with the related art.

A method for controlling the amount of regenerative braking in the mode conversion will be described hereinafter. In other words, a method for controlling the amount of regenerative braking when a mode of the motor is converted from the constant power mode to the constant torque mode will be described.

In a case where the motor torque enters into the constant torque mode from the constant power mode according to a change in motor speed when shifting gears during regenerative braking, gear shifting is mostly ended, and simultaneously, the motor torque again enters into the constant power mode from the constant torque mode. If the motor speed is decreased in the constant power mode, the absolute value of the motor torque is increased, but the motor torque in the constant torque mode is maintained regardless of the motor speed. Hence, in the mode conversion of the motor, the gear ratio during gear shifting is calculated by distinguishing the constant torque mode from the constant power mode, and the regenerative braking amount is controlled using the calculated gear ratio during gear shifting.

Figure 6:
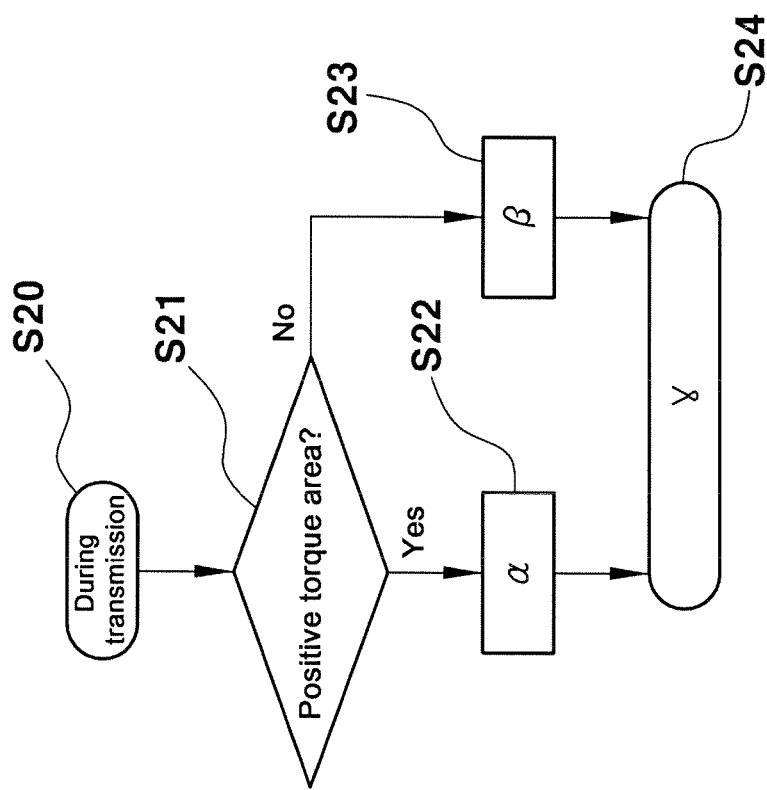
FIG. 6 is a flowchart illustrating a selection method of a gear ratio slope when a mode of motor torque is changed in a method for controlling regenerative braking according to the present disclosure.

As shown in FIG. 6, during the gear shifting (S20), it is decided whether the motor torque enters into the constant torque mode or the constant torque area (S21). In a case where the motor torque enters into the constant torque mode, the gear ratio slope (a, hereinafter, referred to as a 'constant torque gear ratio slope') of Equation 5 is selected as a gear ratio slope (γ) in the mode conversion by considering the differential ratio before/after gear shifting (see Equation 2) (S22), so that the gear ratio during gear shifting is increased with the constant torque gear ratio slope (α). When the motor torque does not enters into the constant torque mode, i.e., when the motor torque is in the constant power mode, the gear ratio slope (β, hereinafter, referred to as a 'constant power gear ratio slope') which is a value derived through experiments is selected as the gear ratio slope (γ) in the mode conversion (S23), so that the gear ratio during gear shifting is increased with the constant power gear ratio slope (β).

That is, one of the constant torque gear ratio slope (α) and the constant power gear ratio slope (β) is used as the gear ratio slope (γ) in the mode conversion, as the gear ratio slope (or gear ratio increase slope) to calculate the amount of regenerative braking. The gear ratio during gear shifting ($GR_{cal}$) in the mode conversion may be calculated as shown in the following Equation 8.

$$GR_{cal} = GR_{before} + \int_{T=0}^{T_{shift\_end}} \gamma \, dT \quad \text{[Equation 8]}$$

Where, $GR_{cal}$ is the gear ratio during gear shifting in the mode conversion, $GR_{before}$ is the gear ratio before gear shifting, γ is the gear ratio slope in the mode conversion, and $T_{shift\_end}$ is a shift end time.

The motor torque before the torque intervention of the TCU is used as the motor torque in the mode conversion. In the mode conversion, the motor torque during gear shifting mostly enters into the constant torque mode from the constant power mode, and then again enters into the constant power mode as the gear shifting is ended.

According to the present disclosure, it is decided that the mode conversion of the motor torque has occurred when the motor torque during gear shifting enters into the constant torque mode from the constant power mode. In the mode conversion, the motor torque is driven in the constant torque mode from the constant power mode and then again enters into the constant power mode. Thus, a fixed motor torque value is used when the motor torque is assumed to be in the constant torque mode when the motor torque reenters into the constant power mode. The gear ratio during gear shifting also uses the gear ratio calculated using the constant torque gear ratio slope (α) which is the gear ratio slope in the constant torque mode (see Equation 8).

The fixed value is used by assuming that the motor torque is in the constant torque mode because it is not easy to estimate an exact shift end time due to the influence of the shift time, road condition, and any change in environment. Since the motor is driven in the constant torque area at an actual shift start time, the motor torque value is fixed to the actual shift start time. Therefore, the linearity of the regenerative braking amount and the regenerative braking torque transmitted to the wheel can be estimated as close as the actual values by assuming that the motor torque is in the constant torque mode and the gear ratio slope is the constant torque gear ratio slope ($\alpha$).

Figure 7:
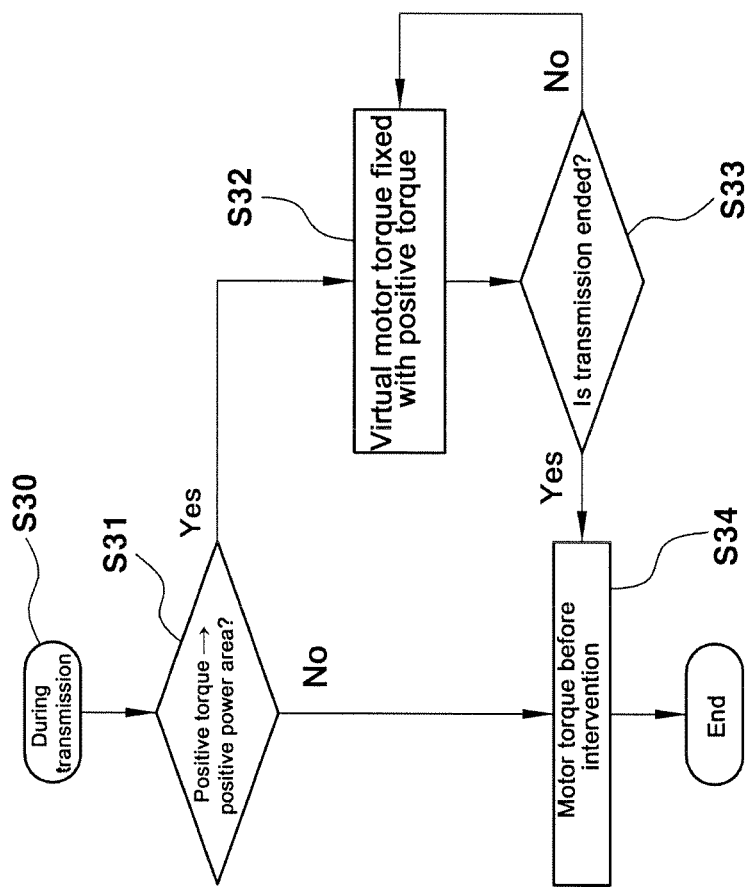
FIG. 7 is a flowchart illustrating a selection method of motor torque when a mode of motor torque is changed in a method for controlling regenerative braking according to the present disclosure.

Referring to FIG. 7, when shifting gears during regenerative braking (S30), it is decided whether the mode conversion of the motor torque occurs (S31). When the mode is converted into the constant power mode from the constant torque mode, a virtual motor torque ($T_{m\_Virtual}$) which is fixed to the constant torque mode during gear shifting, is used as the motor torque (S32), and the amount of regenerative braking is calculated using the virtual motor torque value.

Subsequently, it is decided whether gear shifting is ended while controlling the amount of regenerative braking (S33). When gear shifting is ended, motor torque before the torque intervention is used (S34). When gear shifting is not ended (i.e., during gear shifting), the virtual motor torque ($T_{m\_Virtual}$) which is fixed to the constant torque mode, is used as the motor torque during gear shifting (S32).

When the mode is not converted into the constant torque mode from the constant power mode by deciding whether the mode conversion of the motor torque occurs during gear shifting, i.e., when the mode does not convert in the constant torque mode or in the constant power mode, the motor torque before torque intervention is used as the motor torque during gear shifting.

When the regenerative braking amount in the mode conversion ($REGEN_{AV\_ModeChange}$) is calculated by multiplying the virtual motor torque ($T_{m\_Virtual}$) value and the calculated gear ratio during gear shifting ($GR_{cal}$), the amount of regenerative braking in the mode conversion ($REGEN_{AV\_ModeChange}$) is constantly increased, so that it is possible to ensure the deceleration sensation.

$$REGEN_{AV\_ModeChange}=T_{m\_Virtual}*GR_{cal}*Eff_{TM} \quad \text{[Equation 9]}$$

Where, $REGEN_{AV\_ModeChange}$ is the amount of regenerative braking, $T_{m\_Virtual}$ is the virtual motor torque which is fixed to the constant torque mode, $GR_{cal}$ is the calculated gear ratio during gear shifting, and $Eff_{TM}$ is the transmission efficiency.

The amount of regenerative braking in the mode conversion ($REGEN_{AV\_ModeChange}$) may be calculated as shown in the following Equation 9-1 without considering the transmission efficiency. In a case where the amount of regenerative braking in the mode conversion ($REGEN_{AV\_ModeChange}$) is calculated as shown in Equation 9 by considering the transmission efficiency, a more accurate value is calculated.

$$REGEN_{AV\_ModeChange}=T_{m\_Virtual}*GR_{cal} \quad \text{[Equation 9-1]}$$

Figure 8:
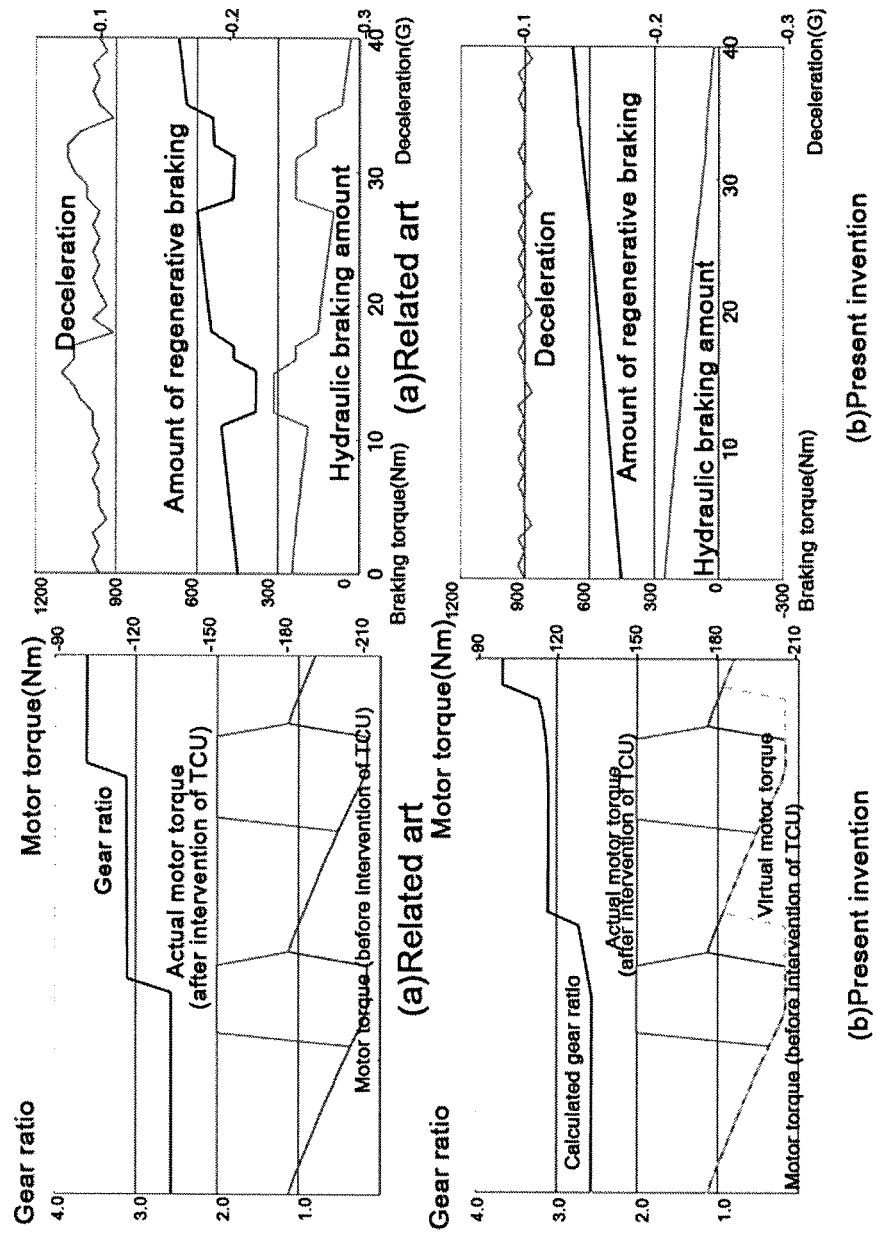
FIG. 8 is a graph illustrating a result obtained by controlling an amount of regenerative braking in a mode change condition of motor torque, as compared with the conventional method, according to the present disclosure.

Referring to FIG. 8, the amount of regenerative braking during gear shifting is controlled in a mode conversion condition of the motor torque. As a result, in a case where the amount of regenerative braking is controlled based on the value calculated through Equation 9, the regenerative braking amount is constantly increased, thus ensuring the deceleration sensation during gear shifting, as compared with the related art.

Hereinafter, a method for controlling a regenerative braking amount when shifting gears in a vehicle will be described with reference to FIG. 9.

Figure 9:
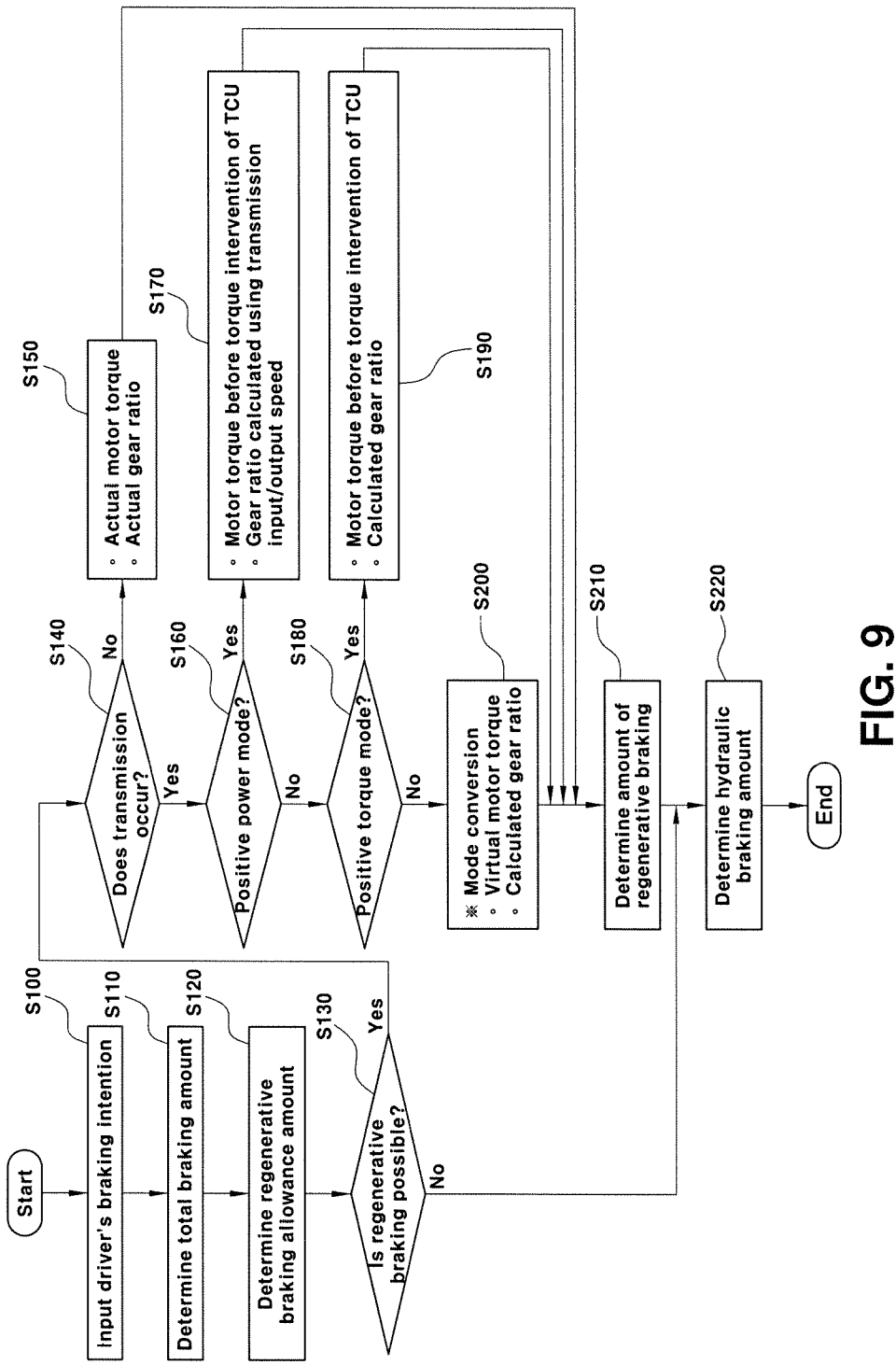
FIG. 9 is a flowchart illustrating a method for controlling regenerative braking of a vehicle.

As shown in FIG. 9, if a driver's braking intention is input (S100), a total braking amount is determined based on the driver's braking intention (S110). A regenerative braking allowance amount in the total braking amount is determined (S120), and it is then decided whether regenerative braking is possible (S130).

When it is determined that the regenerative braking is impossible, a hydraulic braking amount is determined similar to the total braking amount. Once it is decided that the regenerative braking is possible, it is decided whether gear shifting of the vehicle occurs (S140), and the amount of regenerative braking is controlled according to a decided result.

Here, the regenerative braking allowance amount is the maximum braking amount which can be generated through the regenerative braking of the vehicle. The amount of regenerative braking is the actual braking amount which is generated through the regenerative braking in the total braking amount determined by the driver's braking intention during vehicle braking. The amount of regenerative braking is determined and controlled as the regenerative braking allowance amount or less.

When there is no gear shifting during regenerative braking, the amount of regenerative braking is calculated/determined (S210) using the actual motor torque and the actual gear ratio (S150). When shifting the gears during the regenerative braking, it is decided whether the motor torque enters into the constant power mode (S160).

When the motor torque enters into the constant power mode, i.e., when the motor torque is in the constant power mode, the regenerative braking amount is determined (S210) using the motor torque before the torque intervention of the TCU and the gear ratio during gear shifting, calculated using and Equation 2 (S170).

In other words, when the motor torque enters into the constant power mode, the amount of regenerative braking is determined using the motor torque before the torque intervention of the TCU and the gear ratio calculated using the transmission input speed and the transmission output speed according to Equation 2. In the constant power mode condition of the motor torque, the amount of regenerative braking may be calculated using Equation 3.

In a case where the motor torque does not enter into the constant power mode, it is decided whether the motor torque enters into the constant torque mode (S180). When the motor torque enters into the constant torque mode, i.e., when the motor torque is in the constant torque mode, the amount of regenerative braking is determined (S210) using the motor torque before the torque intervention of the TCU and the gear ratio during gear shifting calculated using Equation 6 (S190). In the constant torque mode condition of the motor torque, the amount of regenerative braking may be calculated using Equation 7.

In a case where the motor torque does not enters into the constant torque mode, it is decided that the motor torque is under mode conversion (S200), the amount of regenerative braking is determined (S210) using the virtual motor torque which is fixed to the constant torque mode, and the gear ratio during gear shifting, calculated using Equation 8 (S200). In the mode conversion condition of the motor torque, the amount of regenerative braking may be calculated using Equation 9.

After the amount of regenerative braking is determined through the aforementioned procedure when shifting the gears during the regenerative braking (S210), other braking amount except the determined amount of regenerative braking is determined as the hydraulic braking amount (S220). That is, other braking amount obtained by subtracting the determined amount of regenerative braking from the total braking amount is determined as the hydraulic braking amount.

The regenerative braking and the hydraulic braking are controlled according to the regenerative braking amount and the hydraulic braking amount, determined as described above, thus performing stable braking of the vehicle.

In the method for controlling regenerative braking according to the present disclosure, it is possible to maximize regenerative braking of the vehicle by solving a problem of the related art hybrid vehicle having the discrete variable transmission mounted therein, where braking is limited due to variation in deceleration sensation when shifting the gears during regenerative braking.

Accordingly, it is possible to remarkably improve fuel efficiency without any increase in cost and to minimize a change in deceleration sensation, thereby ensuring user's safety and drivability.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for controlling regenerative braking of a vehicle, in which a driving area of a motor is decided when shifting gears in the vehicle during regenerative braking, and a regenerative braking amount is determined, based on the decided driving area of the motor,
   wherein it is decided, in order to decide the driving area of the motor, whether a motor torque is in a constant power mode, whether the motor torque is in a constant torque mode, and whether a mode of the motor torque is converted into the constant torque mode from the constant power mode, and
   wherein it is decided that the mode conversion of the motor torque occurs when the motor torque during gear shifting enters into the constant torque mode from the constant power mode, and in the mode conversion, the amount of regenerative braking is determined using a virtual motor torque value, which is fixed to the constant torque mode, and a gear ratio during gear shifting in the mode conversion.

2. The method of claim 1, wherein, when the motor torque is in the constant power mode, the regenerative braking amount is determined using motor torque before torque intervention of a transmission control unit (TCU) and a gear ratio during gear shifting in the constant power mode.

3. The method of claim 1, wherein, when the motor torque is in the constant power mode, the amount of regenerative braking is determined by $REGEN_{AV\_StadyPower} = T_{m\_BeforeInt} * GR_{cal}$, and a gear ratio during gear shifting uses a value calculated by $$GR_{cal} = \frac{\omega_{TmIn}}{\omega_{TmOut}},$$

wherein $GR_{cal}$ is the calculated gear ratio during gear shifting, $\omega_{TmIn}$ is a transmission input speed, $\omega_{TmOut}$ is a transmission output speed, $REGEN_{AV\_StadyPower}$ is the amount of regenerative braking in the constant power mode, and $T_{m\_BeforeInt}$ is motor torque before torque intervention.

4. The method of claim 1, wherein, when the motor torque is in the constant power mode, the amount of regenerative braking is determined by $REGEN_{AV\_StadyPower} = T_{m\_BeforeInt} * GR_{cal} * Eff_{TM}$, and a gear ratio during gear shifting uses a value calculated by $$GR_{cal} = \frac{\omega_{TmIn}}{\omega_{TmOut}},$$

wherein $GR_{cal}$ is the calculated gear ratio during gear shifting, $\omega_{TmIn}$ is a transmission input speed, $\omega_{TmOut}$ is a transmission output speed, $REGEN_{AV\_StadyPower}$ is the amount of regenerative braking in the constant power mode, $T_{m\_BeforeInt}$ is motor torque before torque intervention, and $Eff_{TM}$ is a transmission efficiency.

5. The method of claim 1, wherein, when the motor torque is in the constant torque mode, the amount of regenerative braking is determined using the motor torque before torque intervention of a transmission control unit (TCU) and a gear ratio during gear shifting in the constant torque mode.

6. The method of claim 1, wherein, when the motor torque is in the constant torque mode, the amount of regenerative braking is determined by $REGEN_{AV\_StadyTorque} = T_{m\_BeforeInt} * GR_{cal}$, and a gear ratio during gear shifting uses a value calculated by $$GR_{cal} = GR_{before} + \int_{T=0}^{T_{shift\_end}} \alpha \, dT,$$

wherein $GR_{cal}$ is the gear ratio during gear shifting in the constant torque mode, $GR_{before}$ is a gear ratio before gear shifting, $\alpha$ is a gear ratio slope in the constant torque mode, $REGEN_{AV\_StadyTorque}$ is the amount of regenerative braking in the constant torque mode, $T_{m\_BeforeInt}$ is the motor torque before torque intervention, and $T_{shift\_end}$ is a shift end time.

7. The method of claim 1, wherein, when the motor torque is in the constant torque mode, the regenerative braking amount is determined by $REGEN_{AV\_StadyTorque} = T_{m\_BeforeInt} * GR_{cal} * Eff_{TM}$, and a gear ratio during gear shifting uses a value calculated by $$GR_{cal} = GR_{before} + \int_{T=0}^{T_{shift\_end}} \alpha \, dT$$

wherein $GR_{cal}$ is the calculated gear ratio during gear shifting, $REGEN_{AV\_StadyPower}$ is the amount of regenerative braking in the constant power mode, $T_{m\_BeforeInt}$ is motor torque before torque intervention, $Eff_{TM}$ is a transmission efficiency, $GR_{before}$ is a gear ratio before gear shifting, and $\alpha$ is a gear ratio slope in the constant torque mode.

8. The method of claim 6, wherein the gear ratio slope in the constant torque mode is determined by $$\alpha = \frac{GR_{diff}}{\Delta T_{shift}},$$

and a differential gear ratio uses a value calculated by $$GR_{diff} = GR_{after} - GR_{before},$$

wherein $GR_{after}$ is a gear ratio after gear shifting, $GR_{before}$ is the gear ratio before gear shifting, and $\Delta T_{shift}$ is a shift time.

9. The method of claim 1, wherein, when the mode of the motor torque is converted into the constant torque mode from the constant power mode, the amount of regenerative braking is determined by $REGEN_{AV\_ModeChange} = T_{m\_Virtual} * GR_{cal}$, and a gear ratio during gear shifting uses a value calculated by $$GR_{cal} = GR_{before} + \int_{T=0}^{T_{shift\_end}} \gamma \, dT,$$

wherein $REGEN_{Av\_ModeChange}$ is the amount of regenerative braking in the mode conversion, $T_{m\_Virtual}$ is a virtual motor torque value, which is fixed to the constant torque mode, $GR_{cal}$ is the gear ratio during gear shifting in the mode conversion, $GR_{before}$ is a gear ratio before gear shifting, $\gamma$ is a gear ratio slope in the mode conversion, and $T_{shift\_end}$ is a shift end time.

10. The method of claim 1, wherein, when the mode of the motor torque is converted into the constant torque mode from the constant power mode, the amount of regenerative braking is determined by $REGEN_{AV\_ModeChange} = T_{m\_Virtual} * GR_{cal} * Eff_{TM}$, and a gear ratio during gear shifting uses a value calculated by $$GR_{cal} = GR_{before} + \int_{T=0}^{T_{shift\_end}} \gamma \, dT,$$

wherein $REGEN_{AV\_ModeChange}$ is the amount of regenerative braking in the mode conversion, $T_{m\_Virtual}$ is a virtual motor torque value which is fixed to the constant torque mode, $GR_{cal}$ is the gear ratio during gear shifting in the mode conversion, $Eff_{TM}$ is a transmission efficiency, $GR_{before}$ is a gear ratio before gear shifting, $\gamma$ is a gear ratio slope in the mode conversion, and $T_{shift\_end}$ is a shift end time.

11. The method of claim 9, wherein a gear ratio slope ($\alpha$) in the constant torque mode is used as the gear ratio slope ($\gamma$) in the mode conversion, and the gear ratio slope ($\alpha$) is calculated by $$\alpha = \frac{GR_{diff}}{\Delta T_{shift}},$$

wherein $GR_{diff}$ is a differential gear ratio between before and after gear shifting, and $\Delta T_{shift}$ is a shift time.

* * * * *